Figure 1:
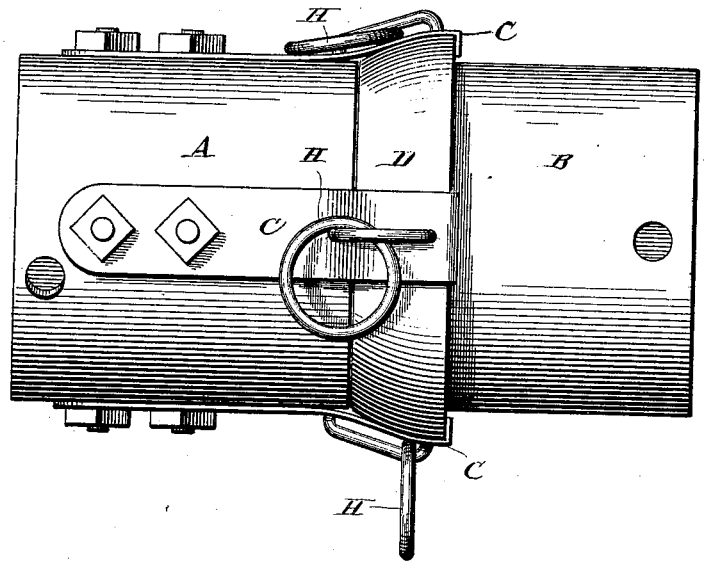
Figure 2:
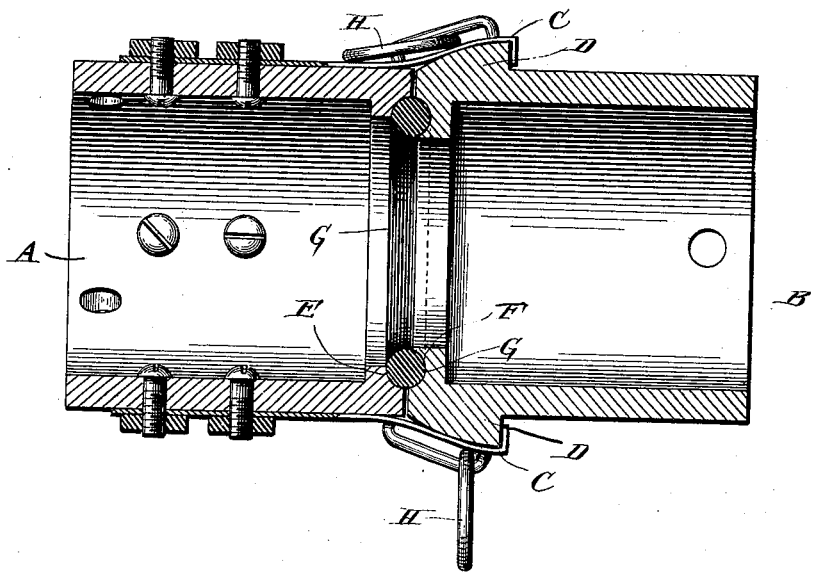

No. 645,707. Patented Mar. 20, 1900.
E. J. HANNOLD.
HOSE COUPLING.
(Application filed Sept. 26, 1899.)

(No Model.)

Witnesses:
Oliver Brown
A. A. Campbell

Inventor:
Ed J. Hannold

UNITED STATES PATENT OFFICE.

ED J. HANNOLD, OF ANDERSON, INDIANA.

HOSE-COUPLING.

SPECIFICATION forming part of Letters Patent No. 645,707, dated March 20, 1900.

Application filed September 26, 1899. Serial No. 731,776. (No model.)

*To all whom it may concern:*

Be it known that I, ED J. HANNOLD, a citizen of the United States, residing at Anderson, in the county of Madison and State of Indiana, have invented a new and useful Improvement in Hose-Couplings, of which the following is a specification.

My invention relates to improvement in hose-couplings for water, steam, or air in which the coupling is made by three or four spring-steel clutches on one section of joint clasping over a beveled shoulder on the other section; and the objects of my improvement are to provide a quick, perfect, and non-leakable coupling. I attain these results as shown by the drawing accompanying this specification, in which—

A represents entry end of coupling; B represents discharge end of coupling; C represents steel spring-clutches fastened on A; D represents beveled shoulder on B; E represents seat in entry end of coupling; F represents seat in discharge end of coupling; G represents flexible rubber ring, and H represents flat ring stapled on clutches, all to be made of any material desired and which might be improved in the hands of a skilled mechanic.

To make coupling, simply take sections A and B and force them together until clutches C slide over beveled shoulder D and clasp, thus making a quick coupling, as shown by drawing. The coupling thus made by the clutching together of A and B forms a pocket of seats E and F, as shown in drawing, in which is the flexible rubber ring G, which is held in position in seat E by two or more pivots or screws, as desired, to outer edge of seat E, section A. Seat E being lower than inside edge of rubber ring G and seat F, the high pressure of water, steam, or air entering section A passes over seat E, striking rubber ring G, driving it tight into pocket and seam caused by the coupling together of A and B, making a perfect and non-leakable joint, as shown by drawing. To uncouple same, raise rings H (which by reason of being flat and stapled by long staples to clutches C they lay back out of the way and cannot interfere with clutches C in making coupling) and pull as many clutches C off of shoulder D as may be necessary to break the joint.

The hose being fastened on the inside of A and B, no room is taken up by seats E and F or ring G. Hence no decrease is caused in the volume of water, steam, or air.

I am aware that prior to my invention hose-couplings were made by the slower process of screwing the joint together. Hence—

What I claim, and desire to secure by Letters Patent, is—

1. In a hose-coupling, the sections to receive the hose having inside annular flanges near their ends to form a seat between the two flanges for a packing, one of said sections having an outside flange with abrupt inner side approximately at right angles to the sides of the couplings and an oblique or tapering outer wall, spring-hooks attached to the other section and adapted to engage said outside flange when the ends of the sections are brought together, and a packing located in the above-mentioned seat, substantially as described and shown.

2. In a hose-coupling, the sections to receive the hose having inside annular flanges near their ends forming a pair constituting a packing-seat, the flange of each pair nearest the side from which the pressure comes being the lower of the two for the purpose described, one of said coupling-sections having an outside flange with abrupt inner side approximately at right angles to the sides of the coupling-section and oblique tapering outer wall, spring-hooks attached to the other section and adapted to engage said outside flange when the ends of the sections are brought together, and a packing located in the seat formed by the inside flanges, substantially as described and shown.

3. In a hose-coupling, the sections to receive the hose having inside annular flanges near their ends forming a pair which constitute a packing-seat, one of said coupling-sections having an outside flange adjacent to its end having an inner abrupt and an outer sloping side, spring-hooks attached to the other section and adapted to engage said outside flange when the ends of the sections are brought together said springs having pulls, and a packing-ring in the seat at the joint, substantially as described and shown.

4. In a hose-coupling, the sections to receive the hose having inside annular flanges near their ends forming a pair which constitute a packing-seat, one of said coupling-sections having an outside flange adjacent to its ends with inner abrupt and sloping outer sides, spring-hooks attached to the other sections and adapted to engage said outside flange when the ends of the sections are brought together, pulls on the hooks consisting of elongated staples and rings loosely engaged by said staples, and a packing-strip in the seat at the joint of the coupling, substantially as described and shown.

ED J. HANNOLD.

Witnesses:
C. D. HARDY,
CHARLES T. SANSBERRY.